Sept. 3, 1968

J. A. VINSON 3,399,694

HIGH SPEED, HIGH POWER RECIPROCATING PUMPS
AND VALVE STACKS THEREFOR

Filed Aug. 31, 1965

INVENTOR
John A. Vinson
BY Arnold & Roylance
ATTORNEYS

INVENTOR
John A. Vinson
BY Arnold and Roylance
ATTORNEYS

United States Patent Office 3,399,694
Patented Sept. 3, 1968

3,399,694
HIGH SPEED, HIGH POWER RECIPROCATING PUMPS AND VALVE STACKS THEREFOR
John A. Vinson, Gainesville, Tex., assignor to Armco Steel Corporation, Middletown, Ohio, a corporation of Ohio
Filed Aug. 31, 1965, Ser. No. 483,958
3 Claims. (Cl. 137—512)

ABSTRACT OF THE DISCLOSURE

High power, high speed operation of reciprocating pumps, such as are used for water flooding in secondary recovery of oil, is achieved by use of an improved suction and discharge valve stack employing rigid valve discs each operating in a guiding and retaining cage, the valve discs and cages being so interrelated as to eliminate mechanical interference between the discs and cages during operating movement of the discs.

---

This invention relates to high speed, high power reciprocating pumps and to an improved suction and discharge valve stack therefor.

Reciprocating pumps employed for water flooding in the secondary recovery of oil from wells and similar purposes must operate under high power, high speed conditions which make design of the suction and discharge valves particularly difficult. Thus, the driving mechanisms of such pumps commonly operate at 200–500 r.p.m., and the pump may be called on to deliver as much as 325 gallons per minute with maximum discharge pressures ranging up to 6000 p.s.i. Many types of suction and discharge valves have been employed in such pumps with varying degrees of success. In view of the high power conditions involved, some prior-art workers have employed ball valves, relying on the inherent strength of the ball to provide long life and dependability. Such valves have not been truly satisfactory, however, because the weight of the ball makes it difficult to achieve the desired operating speeds and because, with the ball cooperating with a spherical seat, the ball must have an unduly long travel in order to open adequately to provide full fluid flow. It has also been common practice to employ valves of the type disclosed, for example, in U.S. Patent 3,146,724, issued Sept. 1, 1964, to D. J. Cornelsen, but the relatively thin valve elements of such devices are less durable than is desired for many applications and also are not adapted to use in a valve structure having guide means to closely constrain the valve element to a closely predetermined line of rectilinear travel.

It is accordingly a general object of this invention to provide, in reciprocating pumps of the type described, a suction and discharge valve stack which allows the pump to operate dependably for unusually long periods of time despite the demanding conditions of high speed and high power.

Another object is to devise a high speed, high power reciprocating pump characterized by improved operating efficiency.

A further object is to provide a suction and discharge valve stack employing rigid valve discs closely constrained by guiding and retaining cages in such fashion that the possibility of the cages interfering with operating movement of the valve discs is eliminated.

Yet another object is to provide such a valve stack in which the valve discs are equipped with operating springs and the cages serve both to guide and constrain the springs and to provide positive stops to limit travel of the valve elements away from their seats.

Stated broadly, pumps in accordance with the invention include a fluid end structure comprising a block which is integral at least with respect to each cylinder. Preferably, a single integral block provides all of the cylinders of the pump and includes a suction manifold and a discharge path or manifold which are common to all of the cylinders. The cylinders are preferably arranged parallel to each other and side-by-side, and the block is provided with a valve-stack-accommodating bore for each cylinder, the valve stack bore extending transverse to the cylinder and opening at one end into an inlet port communicating with the suction manifold. Commencing at the inlet port, the wall of the valve stack bore extends as a plain right cylindrical surface interrupted only by the end of the pump cylinder and by provision for fluid flow from the dischage valve to the pump outlet. The valve stack includes a suction valve seat member engaged with a shoulder at the suction end of the valve stack bore, a first cage for the suction valve element and its spring, a discharge valve seat engaged with the end of the first cage, a second cage engaged with the discharge valve seat, and a closure member secured in the outer end of the valve stack bore and directly engaging the second cage to provide a metal-to-metal assembly. The second cage constrains the discharge valve element and its spring. The cages, the valve elements and the springs are respectively identical and interchangeable. The two valve seat members, however, differ from each other, the suction valve seat member defining an inlet opening which is distinctly larger than the discharge opening defined by the discharge valve seat member.

Each cage is a generally cylindrical tubular member provided with a plurality of axially extending slots. The end portions of each cage include right cylindrical inner surface portions, one being of smaller diameter to guide the valve spring, the other being of larger diameter to accommodate the valve element, a tapered shoulder being provided intermediate these two portions to serve as a stop for the valve element. Each valve element is in the form of an integral circular disc of sufficient thickness to provide rigidity and of an outer peripheral dimension and configuration such that, though the valve element is closely embraced by the corresponding portion of the inner wall of the cage, mechanical interference between the valve element and the cage is precluded.

In order that the manner in which the foregoing and other objects are attained in accordance with the invention can be understood in detail, one particularly advantageous embodiment thereof will be described with reference to the accompanying drawings, which form a part of this specification, and wherein.

Figure 1:
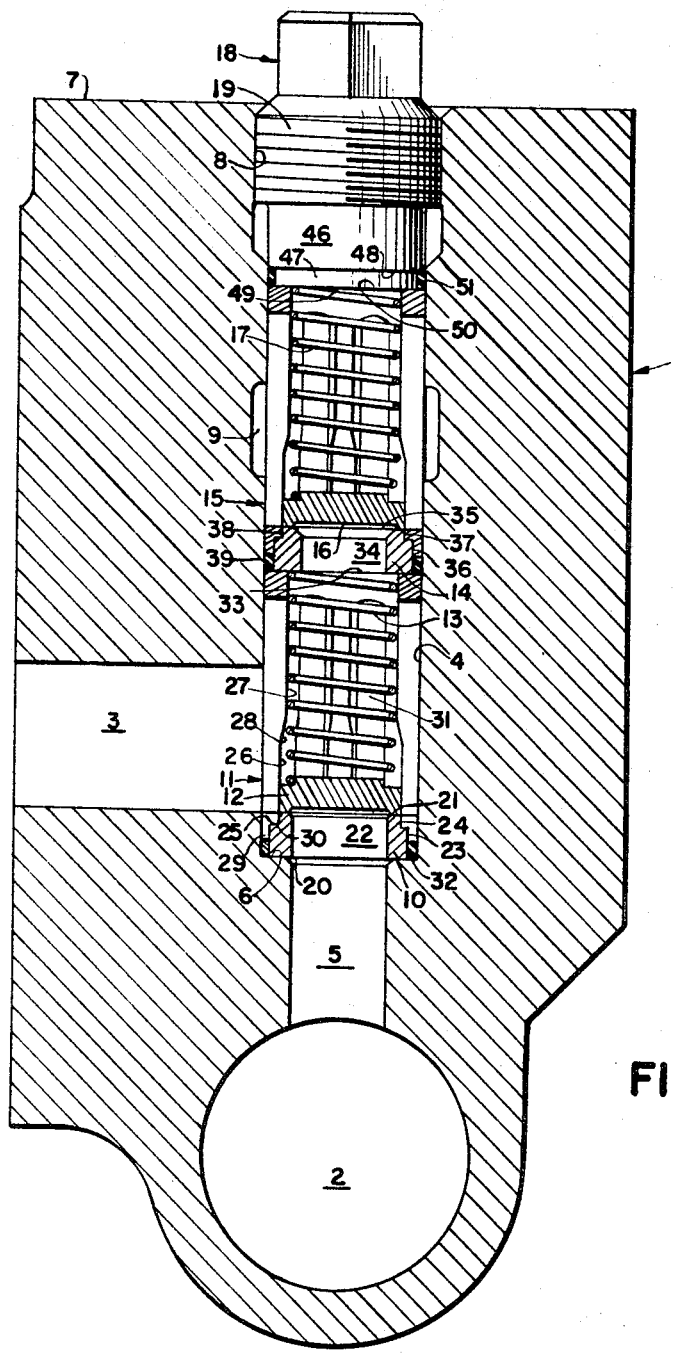
FIG. 1 is a vertical sectional view of a pump fluid end and valve stack in accordance with the invention.

Turning now to the drawings in detail, one embodiment of the invention is shown as applied to a reciprocating plunger pump of the general type disclosed in U.S. Patent 2,766,701, issued Oct. 16, 1956, to A. E. Giraudeau, and in said Patent 3,146,724. Since the specific nature of the pump drive, the plungers, stuffing boxes, and manifold connections, all well known to those skilled in the art, are not critical to an understanding of the invention, such elements have not been illustrated. The pump includes an integral fluid end block 1 provided with a suction manifold 2, a plurality of parallel, side-by-side cylinder bores, one of which is shown at 3, a plurality of valve-stack-accommodating bores 4, and a port 5 connecting the bore 4 to manifold 2.

Bore 4 extends transversely across cylinder bore 3 and terminates at its inner end in a transverse annular shoulder 6. The outer end of bore 4 opens through the top surface 7 of the block 1 and, adjacent wall 7, is provided with an enlarged threaded portion 8. Save for portion 8, bore 4 presents a right cylindrical wall which is interrupted only by intersection with bore 3 and by the enlargement 9 which communicates with the outlet of the pump.

The valve stock comprises suction valve seat member 10, cage member 11, suction valve disc 12, spring 13, discharge valve seat member 14, cage member 15, discharge valve disc 16, and spring 17, the stock being clamped in place by an externally threaded closure plug 18 which has its threaded portion 19 engaged with the internal threads of enlarged bore portion 8.

The suction valve seat member 10 is annular, having a flat bottom face 20 disposed in flush engagement with shoulder 6, and a flat top face 21 which presents a seat to be engaged by valve disc 12. Member 10 defines a cylindrical opening 22 of the same diameter as, and aligned with, port 5. The outer surface of member 10 includes a cylindrical portion 23 of larger diameter and a cylindrical portion 24 of smaller diameter, these two portions being joined by a transverse annular shoulder 25 which faces toward top face 21.

Cage member 11 is an open-ended, generally cylindrical tubular piece and includes an inner wall portion 26 of a diameter such as to snugly embrace outer surface portion 24 of member 10, a second inner wall portion 27 of smaller diameter, and an intermediate frusto-conical shoulder 28 which joins wall portions 26 and 27. The cage member has a lower tip portion 29 of an inner diameter such as to snugly embrace outer surface portion 23 of member 10. Wall portion 26 and the inner wall of tip portion 29 are joined by a transverse annular shoulder 30 adapted for flush engagement with shoulder 25. The cage member is provided with six axially extending slots 31 for communication between bore 3 and the interior of the cage member. With shoulders 25 and 30 engaged, tip portion 29 stops short of shoulder 6, and an annular packing 32 is provided in the space thus provided, the packing being compressed between tip portion 29 and shoulder 6. Opposite tip portion 29, cage member 11 has a flat transverse annular end face 33.

Seated directly on end face 33, discharge seat member 14 defines a cylindrical discharge opening 34 which is of substantially smaller diameter than inlet opening 22. Member 14 is otherwise similar to member 10, including transverse annular top face 35, larger diameter outer surface portion 36, smaller diameter outer surface portion 37, and intermediate shoulder 38.

Cage member 15 is identical to, and interchangeable with, member 11 and is engaged with and seated on member 14 in precisely the same fashion as member 11 is engaged with and seated on member 10. An annular packing 39 is provided, surrounding outer surface portion 36 and compressed between cage members 11 and 15.

Figure 2:
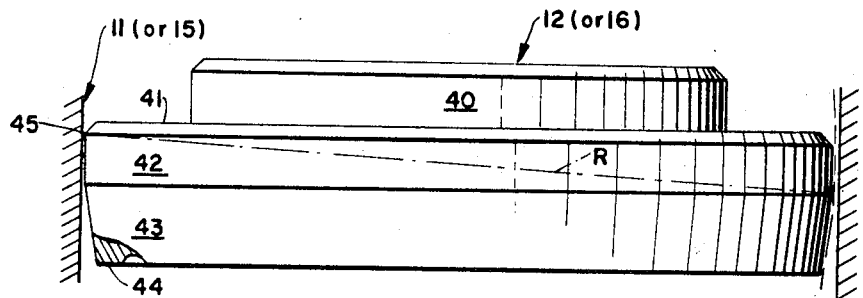
FIG. 2 is an enlarged side elevational view of a valve disc employed in the device of FIG. 1, a portion of the cage with which the valve disc is associated being shown in vertical section.
Figure 3:
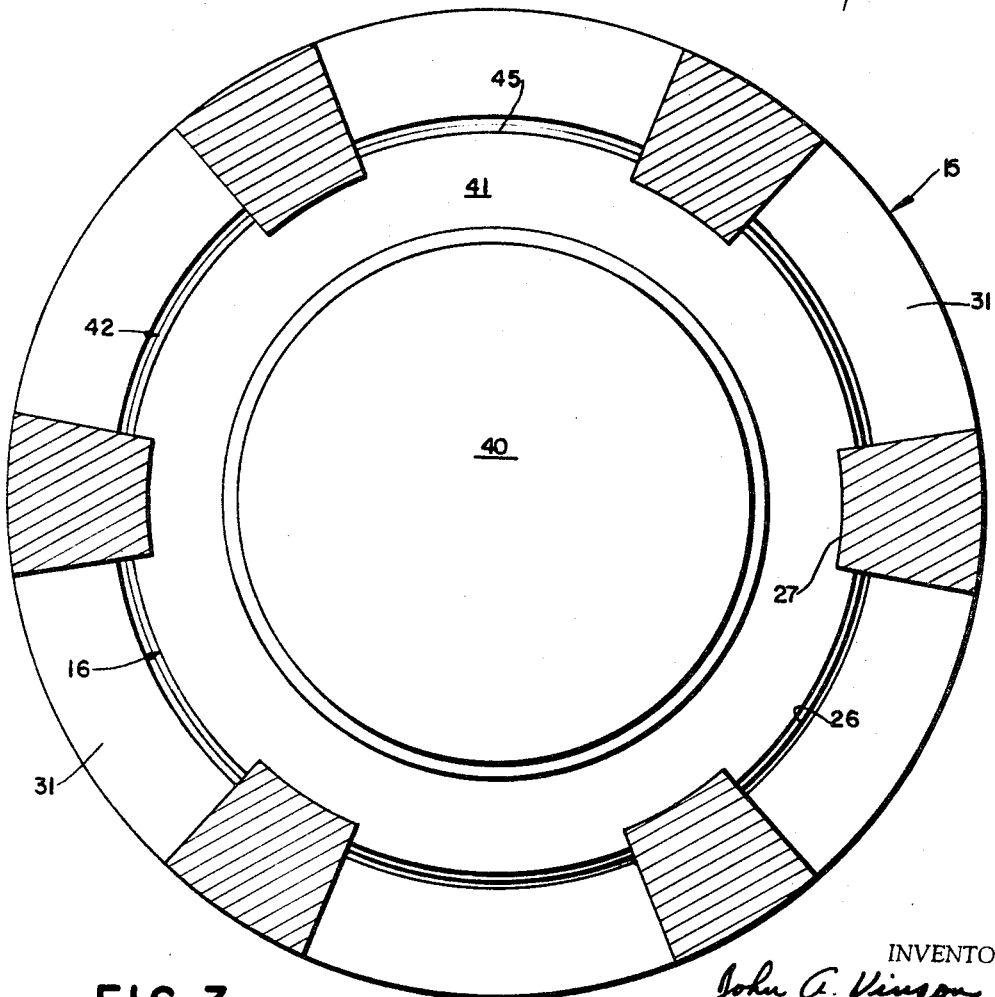
FIG. 3 is a transverse sectional view taken on line 3—3, FIG. 1.

The valve discs 12 and 16 are identical and interchangeable. As seen in FIG. 2, each valve disc has a centrally disposed, upwardly projecting, circular boss 40, a flat, transverse, annular top surface portion 41, a right cylindrical peripheral surface portion 42, a frusto-conical peripheral surface portion 43 which tapers axially and inwardly away from portion 42, and a flat transverse annular valve surface 44 dimensioned to engage the seat 21 of member 10 or the seat 35 of member 14. The valve disc is an integral metal piece of substantial thickness, the thickness being adequate to assure that the disc is essentially rigid under the conditions of operation.

At its outer edge, surface portion 41 continues as a small chamfer and joins peripheral surface portion 42 in a circular edge 45. The diameter of the valve disc is only slightly smaller than the inner diameter of the surrounding portion of the cage member and, though the valve disc is adequately constrained by the cage member, and by the corresponding springs 13, 17, freedom from mechanical interference between the valve disc and the cage member is achieved by the special shape and dimensions of the periphery of the disc. It will thus be noted that any circumferential increment of the periphery of the disc lies wholly within a circle C which has its center located on edge 45 adn is of a radius R equal to the diameter of portion 42, the radius of circle C thus being slightly less than the inner diameter of the surrounding portion of the cage member. Because of this relationship, the valve disc can, when centered in the cage, turn freely about a transverse axis without interference occurring between the periphery of the disc and the inner wall of the cage member. It is accordingly not possible to have the disc hang and jam during its reciprocatory travel within the cage member.

Boss 40 is of a diameter slightly greater than the effective inner diameter of springs 13, 17. As seen in FIG. 1, the lower end of each of springs 13 and 17 tightly embraces the boss 40 of the corresponding valve disc so that the disc is secured to the spring and cannot move transversely relative thereto. Since the spring itself is positively constrained by the smaller inner diameter upper portion of the cage member against lateral distortion, the spring accordingly serves to center the valve disc relative to the cage member and, therefore, relative to the corresponding valve seat member and the annular seat presented thereby.

Plug member 18 has a larger cylindrical portion 46 having a diameter such as to be slidably engaged by the wall of bore 4, and a short cylindrical tip portion 47 of smaller diameter, portions 46 and 47 being joined by a transverse annular shoulder 48. Tip portion 47 terminates in a flat, transverse end face 49 capable of flush engagement with the flat, transverse annular end face 50 of cage member 15. An annular packing 51 surrounds tip portion 47 and is compressed between shoulder 48 and face 50 to seal between discharge seal member 14 and the wall of bore 4.

Operation of reciprocating plunger pumps of this general type is well known and need not be described in detail here save to say that withdrawal of the plunger associated with bore 3 causes a reduction in pressure above valve disc 12 so that that disc is caused to move upwardly within cage 11 against the biasing action of spring 13 so that fluid is drawn from the suction manifold via opening 22. Movement of the plunger in the opposite direction results in an increased pressure above valve disc 12, so that that disc is forced downwardly against the seat afforded by member 12 while disc 16 is forced upwardly away from member 14, against the biasing action of spring 17, to allow the fluid to be forced through opening 34, cage member 15, and space 9 to the outlet of the pump. Withdrawal of the plunger again causes valve disc 16 to move downwardly to seat on member 14, disc 12 again moving upwardly to open position.

During such rectilinear movement, the valve discs are maintained transverse to the axis of bore 4 by the guiding action of the cage members 11, 15 and the compliant support provided by springs 13, 17.

The valve stack is easily assembled to prepare the pump for operation, and easily dismantled for inspection and replacement of parts. For assembly, it is only necessary to insert the elements of the valve stack into bore 4 in proper order (recognizing however that the cage members, valve discs, springs and packings are mutually interchangeable) and then install plug member 18 to clamp the elements securely in proper position. For dismantling, it is only necessary to remove the plug member and extract the valve stack elements.

Once installation of the valve stack has been accomplished, all elements thereof except the valve discs and springs are fixed rigidly against movement because of the full metal-to-metal clamping action resulting from series engagement of the plug member, cage member 15, member 14, cage member 11, member 10, and shoulder 6.

In order to prevent the valve disc 12 from escaping through cage 11 into bore 3, in the event of breakage of spring 13, the thickness of the disc 12 is made slightly greater than the spacing between the longitudinally extending portions of the cage defined by slots 31.

Though one particularly advantageous embodiment of the invention has been chosen for illustrative purposes, it will be understood by those skilled in the art that various changes and modifications can be made therein without departing from the scope of the invention as defined in the appended claims.

What is claimed is:

1. In a high power, high speed reciprocating pump, the combination of
   an integral fluid end member having a cylinder bore, a valve-stack-accommodating bore extending transversely of said cylinder bore and intersecting the same, and an inlet opening communicating with one end of said valve-stack-accommodating bore,
      the other end of said valve-stack-accommodating bore opening through a wall of said fluid end member,
      said one end of said valve-stack-accommodating bore being provided with a transverse annular shoulder,
      said valve-stack-accommodating bore having a cylindrical wall extending from said shoulder at least to a point near said other end thereof;
   a valve stack contained within said valve-stack-accommodating bore and comprising
      an annular suction valve seat member engaged with said shoulder and defining an inlet opening,
      a first generally cylindrical tubular cage member having one end engaged with said suction valve seat member, said first cage member having lateral openings communicating with said cylinder bore;
      an annular discharge valve seat member engaged with the other end of said first cage member and defining a discharge opening communicating with the interior of said first cage member;
      a second generally cylindrical tubular cage member identical with said first cage member and having one end engaged with said discharge valve seat member, said second cage member having lateral openings for the discharge of fluid flowing through said discharge valve seat member;
      two identical valve discs, each of said discs being circular and of such thickness as to be essentially rigid, one of said discs being disposed in said first cage memebr adjacent said suction valve seat member, the other of said discs being disposed in said second cage member adjacent said discharge valve seat member;
      two identical helical compression springs, one of said springs being disposed in said first cage member and having one end engaging said one valve disc and the other end engaging said discharge valve seat member, the other of said springs being disposed in said second cage member and having one end engaging said other valve disc;
   the portion of each of said cage members nearest said shoulder of said valve-stack-accommodating bore having an internal diameter slightly larger than the diameter of said valve discs, the portion of each of said cage members nearest said other end of said valve-stack-accommodating bore being of smaller internal diameter and closely embracing the corresponding one of said springs, said portions of larger and smaller diameter of each of said cage members being joined by an intermediate transverse annular shoulder disposed in the path of opening travel of the corresponding one of said valve discs so as to be engaged by the valve disc and serve as a stop to prevent such extreme opening travel of the valve disc as would damage the corresponding one of said springs;
   each of said valve discs having
      a transverse top face joining the periphery of the valve disc in an annular edge,
      a right cylindrical peripheral surface portion adjacent said edge, and
      a frusto-conical peripheral surface portion extending from said right cylindrical surface portion,
      all circumferential increments of said peripheral lying wholly within a circle having its center on said annular edge and a radius slightly smaller than the diameter of said portion of larger internal diameter of the cage member in which the valve disc is disposed,
      whereby the valve disc can be turned through 90° about a transverse axis without occurrence of mechanical interference between the valve disc and its cage member when the valve disc is centered within the cage memebr; and
   a closure member secured in said other end of said valve-stack-accommodating bore,
      said closure member engaging the other end of said second cage member and the other end of said other spring,
      the combination of said section valve seat member, said first cage member, said discharge valve seat member, and said second cage member being clamped in series metal-to-metal contact between said shoulder and said closure member.

2. A valve assembly for high power, high speed reciprocating pumps comprising, in combination,
   a rigid generally cylindrical tubular cage member having flat annular transverse ends,
      the inner wall of said cage member including a right cylindrical portion of smaller diameter adjacent one of said ends, a right cylindrical portion of larger diameter adjacent the other of said ends, and a transverse annular intermediate shoulder joining the inner ends of said right cylindrical portions;
   a rigid annular valve seat member telescopically engaged within said cage member at the one of the ends thereof which is of larger internal diameter,
      said cage member and said seat member having cooperating shoulder means effective to support said cage member directly on said seat member when said seat member is in turn supported by another element of the pump in which the valve assembly is to be installed;
   a circular valve disc of sufficient thickness to be essentially rigid, said disc including
      a flat, transverse annular end face dimensioned to engage said seat member, and
      a flat, transverse annular end face portion opposite said end face and joining the periphery of the disc in an annular edge,
      the periphery of said disc including a right cylindrical surface portion adjacent said annular edge, and frusto-conical surface portion tapering axially inwardly from said right cylindrical portion toward said end face,
      all circumferential increments of said periphery lying wholly within a circle centered on said annular edge and having a radius slightly smaller than the diameter of said larger diameter portion of the inner wall of said cage member, whereby said valve disc can turn freely about a transverse axis without occurrence of mechanical interefrence between said valve disc and said cage member despite the fact that the periphery said disc is closely embraced by said larger diameter portion of the inner wall of said cage member; and a helical compression spring extending axially within said cage member and slidably embraced by said smaller diameter portion of the inner wall of said cage member,
> one end of said spring being engaged with said disc, the diameter of said valve disc being substantially greater than the diameter of smaller diameter portion of the inner wall of said cage member, whereby said intermediate shoulder is operative as a stop to limit travel of said valve disc away from said seat member.

3. In a reciprocating pump, the combination of fluid end means defining a valve-stack-accommodating bore, an inlet opening communicating with one end of said bore, and a passage arranged laterally of said bore to establish communication between said bore and a cylinder of the pump,
> the other end of said valve-stack-accommodating bore opening through a wall of said fluid end means to the exterior thereof,
> said one end of said valve-stack-accommodating bore having a transverse annular shoulder facing toward said other end,
> said valve-stack-accommodating bore having a cylindrical wall extending from said shoulder at least to a point near said other end;

a valve stack contained within said bore and comprising
> an annular suction valve seat member having a first annular face engaged with said shoulder, an outer surface portion adjacent said first annular face and concentric with and spaced from the wall of said bore, and a second annular face directed toward said other end of said bore,
> an annular packing between said outer surface portion and the wall of said bore,
> a first tubular cage member disposed in said bore and having a tip cylindrical portion projecting into the space between said valve seat member and the wall of said bore to engage and compress said packing, said first cage member having a transverse annular inner shoulder engaged with said valve seat member on the side thereof opposite said first annular face,
> an annular discharge valve seat member having a first annular face engaged with the end of said first cage member opposite said suction valve seat member, an outer surface portion adjacent said first annular face and concentric with and spaced from the wall of said bore, and a second annular face directed toward said other end of said bore,
> two identical and interchangeable cage members of generally cylindrical tubular form each having a first portion of smaller internal diameter at one end of the cage member, a second portion of larger internal diameter adjacent the other end of the cage member, and a cylindrical tip at said other end which is of greater internal diameter than said second portion, said first and second portions being joined by an intermediate portion having a frusto-conical inner surface tapering inwardly from said second portion toward said first portion, there being a transverse annular inner shoulder between said tip and said second portion,
> an annular suction valve seat member having a first annular face engaged with said shoulder of said bore, an outer surface portion adjacent said first face and spaced concentrically inwardly from the wall of said bore to provide a space capable of accommodating said tip of one of said cage members, and a second annular face directed toward said other end of said bore,
> a first annular packing between said outer surface portion of said suction valve seat member and the wall of said bore,
> one of said cage members being disposed in said bore with said tip thereof extending into said space between said suction valve seat member and the wall of said bore to compress said first packing, said inner shoulder of said one cage member engaging said suction valve seat member to urge the same against said shoulder of said bore, said second face of said seat member extending inwardly beyond said second portion of said one cage member,
> an annular discharge valve seat member having a first annular face engaged with said one end of said one cage member, an outer surface portion adjacent said first face and spaced concentrically inwardly from the wall of said bore to provide a space capable of accommodating said tip of the other of said cage members, and a second annular face directed toward said other end of said bore,
> a second annular packing between said outer surface portion of said discharge valve seat member and the wall of said bore,
> the other of said cage members being disposed in said bore with said tip thereof extending into said space between said discharge valve seat member and the wall of said bore to compress said second packing, said inner shoulder of said other cage member engaging said discharge valve seat member to urge the same against said one end of said one cage member,
> two identical and interchangeable circular valve discs of such thickness as to be essentially rigid and having a diameter slightly smaller than the internal diameter of second portions of said cage members and larger than the internal diameter of said first portions thereof, one of said discs being disposed in said second portion of said one cage member to cooperate with said suction valve seat member, and the other of said discs being disposed in said second portion of said other cage member to cooperate with said discharge valve seat member,
> two identical and interchangeable helical compression springs of a diameter slightly smaller than the internal diameter of said first portions of said cage members, one of said springs being disposed in said one cage member and engaged between said discharge valve seat member and said one valve disc to urge the latter against said second annular face of said suction valve seat members, the other of said springs being disposed in said other cage member with one end of said other spring engaging said other valve disc; and a closure member secured in said other end of said bore,
> said closure member engaging said one end of said other cage member and the other end of said other spring, the combination of said suction valve seat member, said one cage member, said discharge valve seat member, and said other cage member being clamped in series metal-to-metal contact between said shoulder of said bore and said closure member, said frusto-conical inner surfaces of said cage members being operative as positive stops to limit travel of the respective ones of said discs in a valve-opening direction and thereby prevent such travel of said discs from damaging said springs.

References Cited

UNITED STATES PATENTS

| | | | |
|---|---|---|---|
| 2,021,351 | 11/1935 | Carson | 137—533.19 |
| 3,030,978 | 4/1962 | Griffith | 137—543.19 |
| 3,134,332 | 5/1964 | Nelson | 103—228 |
| 3,146,724 | 9/1964 | Cornelsen | 103—223 |
| 3,172,369 | 3/1965 | Bally | 103—228 |

WILLIAM F. O'DEA, *Primary Examiner.*

H. M. COHN, *Assistant Examiner.*

UNITED STATES PATENT OFFICE
CERTIFICATE OF CORRECTION

Patent No. 3,399,694                        September 3, 1968

John A. Vinson

It is certified that error appears in the above identified patent and that said Letters Patent are hereby corrected as shown below:

Column 7, line 36, beginning with "an annular" cancel all to and including "said bore," in line 59, same column 7.

Signed and sealed this 27th day of January 1970.

(SEAL)
Attest:

Edward M. Fletcher, Jr.                      WILLIAM E. SCHUYLER, JR.
Attesting Officer                              Commissioner of Patents